(12) United States Patent
Zhou et al.

(10) Patent No.: US 9,716,620 B2
(45) Date of Patent: *Jul. 25, 2017

(54) CONSTRUCTING A NETWORK ENABLING LAYER-2 INTERCONNECTION OF DATA CENTERS

(71) Applicant: Hewlett Packard Enterprise Development LP, Houston, TX (US)

(72) Inventors: Wan Zhou, Beijing (CN); Guoping Zhu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/966,418

(22) Filed: Dec. 11, 2015

(65) Prior Publication Data

US 2016/0112258 A1 Apr. 21, 2016

Related U.S. Application Data

(63) Continuation of application No. 14/130,401, filed as application No. PCT/CN2012/079630 on Aug. 3, 2012, now Pat. No. 9,264,305.

(30) Foreign Application Priority Data

Sep. 1, 2011 (CN) .......................... 2011 1 0257140

(51) Int. Cl.
*G06F 15/16* (2006.01)
*H04L 12/24* (2006.01)
(Continued)

(52) U.S. Cl.
CPC ...... *H04L 41/0806* (2013.01); *H04L 12/4633* (2013.01); *H04L 49/70* (2013.01); *H04L 65/1073* (2013.01); *H04L 69/324* (2013.01)

(58) Field of Classification Search
CPC ............. G06F 9/45533; G06F 9/45558; H04L 12/4641; H04L 67/10; H04L 12/4633
See application file for complete search history.

(56) References Cited

U.S. PATENT DOCUMENTS 7,349,965 B1 3/2008 Graupner et al.
7,411,975 B1 8/2008 Mohaban
(Continued)

FOREIGN PATENT DOCUMENTS

CN 101557336 10/2009
CN 101730170 6/2010
(Continued)

OTHER PUBLICATIONS

CN First Office Action dated Aug. 23, 2013 issued on CN Patent Application No. 201110257140.3 dated Sep. 1, 2011, The State Intellectual Property Office, P.R. China.
(Continued)

*Primary Examiner* — Peling Shaw
(74) *Attorney, Agent, or Firm* — Hewlett Packard Enterprise Patent Department (57) ABSTRACT

A method for constructing a network enabling layer-2 interconnection of data centers includes: a current data center registers at a neighbor server when the current data center gets online, obtains information of all registered data centers, generates a virtual bridge port for each registered data center; after the current data center comes online, the current data center obtains information of all newly registered data centers according to a pre-set rule, generates a virtual bridge port for each newly registered data center; establishes a tunnel to each registered data center by using the virtual bridge port corresponding to the registered data center, and transmit data via the tunnel.

15 Claims, 4 Drawing Sheets

(51) Int. Cl.
*H04L 12/931* (2013.01)
*H04L 12/46* (2006.01)
*H04L 29/06* (2006.01)
*H04L 29/08* (2006.01)

(56) References Cited

U.S. PATENT DOCUMENTS

| 8,116,308 B2* | 2/2012 | Ellis .................. H04L 12/24 |
| | | 370/352 |
| 2006/0013211 A1 | 1/2006 | Deerman et al. |
| 2008/0225853 A1 | 9/2008 | Melman et al. |
| 2008/0259873 A1 | 10/2008 | Ahmavaara et al. |
| 2012/0163388 A1 | 6/2012 | Goel et al. |
| 2013/0136126 A1* | 5/2013 | Wang ................... H04L 61/103 |
| | | 370/392 |
| 2013/0182712 A1 | 7/2013 | Aguayo et al. |
| 2014/0351106 A1 | 11/2014 | Furr et al. |
| 2015/0169340 A1 | 6/2015 | Haddad et al. |

FOREIGN PATENT DOCUMENTS

| CN | 102263704 | 11/2011 |
| KR | 10-0764063 | 10/2007 |
| KR | 20110027682 | 3/2011 |
| WO | WO-2010/127610 | 11/2010 |

OTHER PUBLICATIONS

Extended European Search Report dated Mar. 16, 2015, EP Patent Application No. 12827139.2 dated Aug. 3, 2012, European Patent Office.

Grover, H. et al, "Overlay Transport Virtualization draft-hasmit-otv-02", Internet Engineering Task Force, Internet Society, No. 2, Jul. 12, 2011, pp. 1-27, XP015077370.

International Search Report and Written Opinion dated Nov. 8, 2012 issued on PCT Patent Application No. PCT/CN2012/079630 dated Aug. 3, 2012, The State Intellectual Property Office, the P.R. China.

* cited by examiner

CONSTRUCTING A NETWORK ENABLING LAYER-2 INTERCONNECTION OF DATA CENTERS

CLAIM FOR PRIORITY

The present application is a continuation of U.S. Pat. No. 9,264,305 which originated as U.S. patent application Ser. No. 14/130,401, filed Dec. 31, 2013, which is national stage filing under 35 U.S.C. §371 of PCT application number PCT/CN2012/079630, having an international filing date of Aug. 3, 2012, which claims priority to Chinese patent number 102263704 which originated as Chinese patent application number 201110257140.3, filed on Sep. 1, 2011, the disclosures of which are hereby incorporated by reference in their entireties.

BACKGROUND

A data center is a location in which various services are provided, such as, data processing, data storage and data exchange. To provide better services, a service provider generally deploys a plurality of data centers (also referred to as sites, and each site usually includes multiple physical devices) at different geographical locations for load balancing and for higher reliability. Furthermore, hardware resources of multiple servers can be virtualized to form a resource pool by using server virtualization techniques. A virtual server may be capable of managing multiple hardware facility platforms, and enabling a virtual machine to move freely from one data center to another. Moving of a virtual machine should be transparent to users. therefore the virtual server should have the same IP address after the move. Therefore it is desirable to provide layer 2 interconnection between data centers in different geographical locations.

BRIEF DESCRIPTION OF THE DRAWINGS

Features of the present disclosure are illustrated by way of example and not limited in the following figure(s), in which like numerals indicate like elements, in which.

DETAILED DESCRIPTION OF EXAMPLES

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

At present, in a public network which only supports IP techniques, interconnection of data centers may be implemented by utilizing the overlay transport virtualization (OTV) technique. In an edge device of each data center, an IP address is configured for each physical port connected with the core network and is associated with one or multiple OTV virtual ports. Each OTV virtual port may serve as an egress interface in a layer-2 forwarding table. The OTV technique will be described with reference to the drawings.

Figure 1:
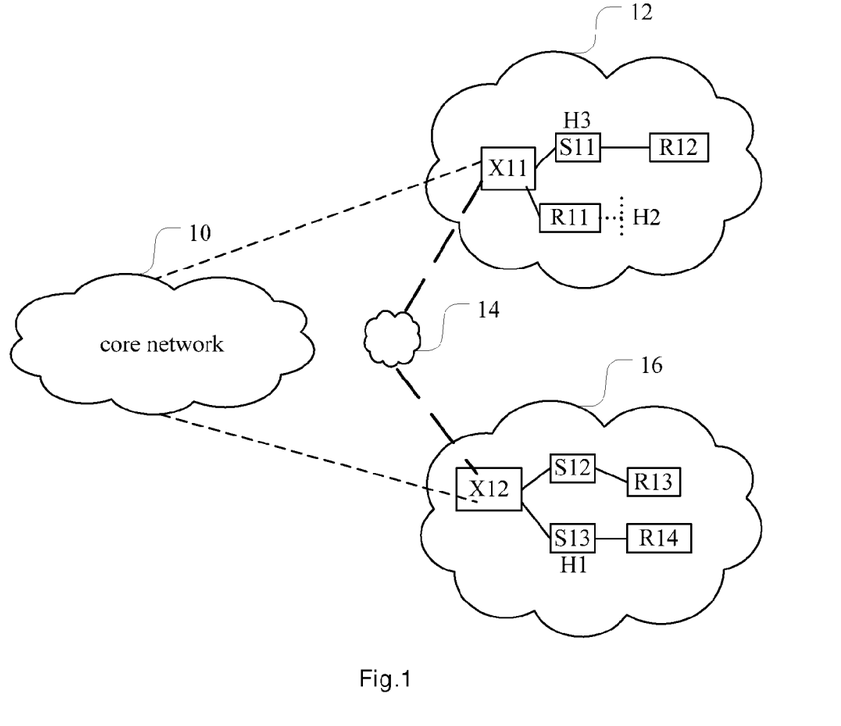
FIG. 1 is a schematic illustrating a conventional network structure implementing layer-2 interconnection of data centers by adopting OTV.

FIG. 1 is a schematic illustrating a conventional network structure implementing layer-2 interconnection of data centers by adopting OTV. Network 10 is the core network and may e.g. run a pUMRP (provider Universal Multicast Rendezvous Point) protocol. Networks 12, 16 are data center sites respectively, and may e.g. run a cUMRP (client Universal Multicast Rendezvous Point) protocol. Network 14 is a virtual network built on network 10, and may run an oUMRP (overlay Universal Multicast Rendezvous Point) protocol. Network 12 includes an edge device X11, a switch S11, and routers R11 and R12. A host H3 accesses network 12 via S11, and a host H2 accesses network 12 via R11. Network 16 includes an edge device X12, switches S12 and S13, and routers R13 and R14. A host H1 accesses network 16 via S13.

One way to realize Layer-2 interconnection between data centers is to use an Overlay Transport Virtualization (OTV) technique through edge devices of the data centers.

For example, in the network structure shown in FIG. 1, when a broadcast is needed, an IP multicast group of an arbitrary source multicast (bi-directional arbitrary source multicast, ASM/Bidir) type which is allocated by the core network maybe configured in X11 and X12. When X11 receives a broadcast packet from an internal interface, X11 encapsulates the broadcast packet according to the OTV protocol and sends the broadcast packet to the remote OTV device X12 via multicast in the core network. X12 decapsulates the received broadcast packet, and broadcasts the decapsulated broadcast packet in the network within the data center of X12. When multicast is needed, IGMP/MLD (Internet Group Management Protocol/Multicast Listener Discovery) monitoring is performed in network 12 and 16. Multicast information is recorded into respective multicast forwarding table in X11 and X12. A source specific multicast (SSM) tree is established in the core network for forwarding multicast packets exchanged between the data centers.

Therefore, in the situation that a network implements layer-2 interconnection of data centers by using OTV, then the core network is required to support multicast. If the core network does not support multicast, multicast packets from a MAC address of a host in a site cannot reach other sites, and consequently the data centers cannot be interconnected with each other on layer-2.

An alternative, proposed in this disclosure, is for the data centers to establish a layer-2 interconnection without relying on multicast capability of the core network. One way of doing this is for the data centers to be able to communicate directly with each other. According to one example, in the present disclosure, a data center is able to detect other data centers automatically, and establish a layer-2 tunnel with each detected data center, so that data can be transmitted to each data center via the appropriate layer-2 tunnel.

Figure 2:
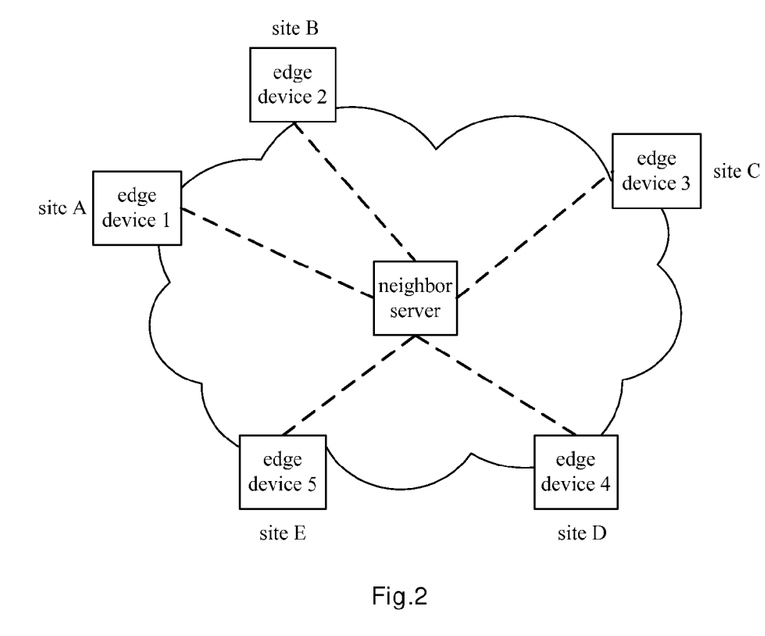
FIG. 2 is a schematic illustrating a network topology supporting layer-2 interconnection of data centers according to an example of the present disclosure.

A number of examples are described below. FIG. 2 is a schematic illustrating a network topology supporting layer-2 interconnection of data centers according to an example. For purposes of simplicity, only the edge device of each site is illustrated and the internal topologies of each site have not been illustrated in the drawings. In FIG. 2, sites A, B, C, D, E are connected with the core network via respective edge devices 1, 2, 3, 4, 5. A neighbor server is set in the core network for recording information of data centers that are currently online. The neighbor server may also be set in one of the edge devices. A site refers to a data center.

Figure 3:
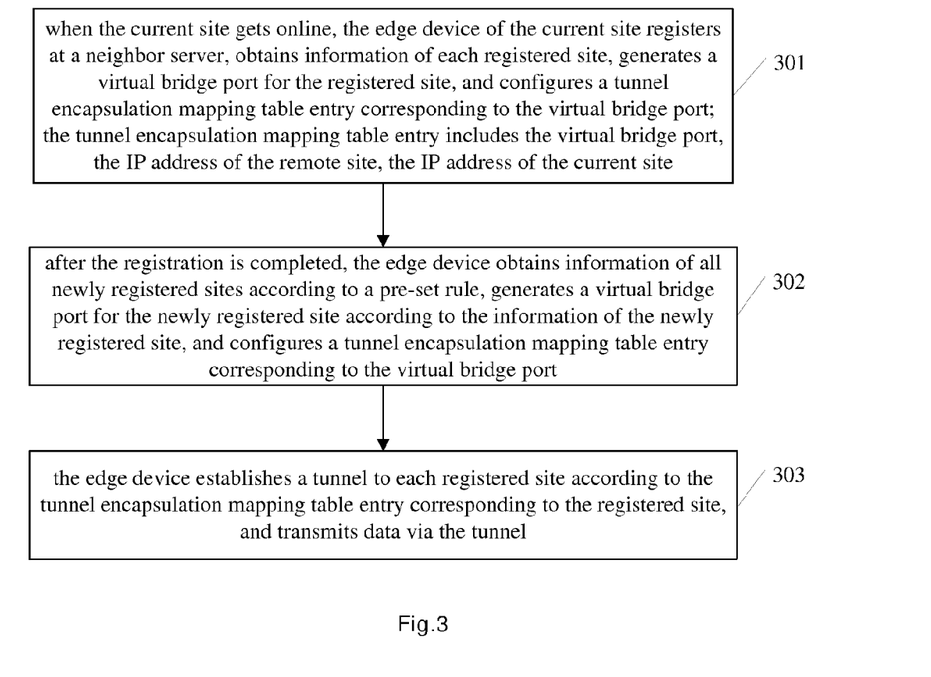
FIG. 3 is a flowchart illustrating a method for constructing a network enabling layer-2 interconnection of data centers according to an example of the present disclosure.

FIG. 3 is a flowchart illustrating a method for constructing a network supporting layer-2 interconnection of data centers according to an example. The method may include the following procedures.

In block 301, an edge device registers at a neighbor server when the site of the edge device comes online, obtains information of all of the sites that have been registered, generates a virtual bridge port for each site that has been registered according to the information obtained for each registered site, and configures a tunnel encapsulation entry corresponding to the virtual bridge port in a tunnel encapsulation mapping table. The tunnel encapsulation entry may include the virtual bridge port, the IP address of a remote site and the IP address of the local site, i.e., the site to which the edge device belongs.

When coming online, each site initially registers at the neighbor server, and comes online after the registration is completed. The neighbor server records information of all sites that have been registered, and provides the information of all currently online sites for a site which is currently performing the registration process. After obtaining the information of all currently online sites, the site may generate a virtual bridge port for each online site, and may configure a tunnel encapsulation entry for the online site in the tunnel encapsulation mapping table.

The generated virtual bridge port is a virtual layer-2 port, not a physical port. However, it has similar functions to a physical layer-2 port. The virtual bridge port may for example be a virtual Ethernet port having similar functions to a physical Ethernet port. The virtual bridge port will be described in detail in the following.

In block 302, after the registration is completed, the edge device obtains information of all newly registered sites from the neighbor server according to a pre-defined rule, generates a virtual bridge port for each newly-registered site, and configures a tunnel encapsulation entry corresponding to the virtual bridge port in the tunnel encapsulation mapping table.

In this procedure, if a site registers at the neighbor server and comes online after the registration is completed, the site needs to obtain information of a newly registered site, and establish a tunnel to the newly registered site based on the information of the newly registered site to implement a layer-2 interconnection with the newly registered site. Therefore, after a site comes online, its edge device still needs to obtain information of newly registered sites at specific times, and generate virtual bridge ports for the newly registered sites.

The newly registered sites are defined against the site currently being described, i.e., as long as the current site has not generated a virtual bridge port for a site that has been registered, the site is a newly registered site from the perspective of the current site, and the current site needs to obtain information of the newly registered site and establish a tunnel with the newly registered site according to the information of the newly registered to implement a layer-2 interconnection with the newly registered site.

In block 303, the edge device establishes a tunnel with each registered site according to the tunnel encapsulation entry corresponding to the registered site in the tunnel encapsulation mapping table, and transmits data via the tunnel.

In this procedure, after a virtual bridge port is generated for each registered site, the edge device of the current site establishes a tunnel with each registered site via the corresponding virtual bridge port. When there is a need to communicate with a registered site, data is communicated via the tunnel, thus implementing a layer-2 interconnection with the registered site.

A register request and a register response may be defined in advance. The register request is a packet sent by an edge device of a data center to the neighbor server, and may include information of a MAC address and an IP address of the edge device sending the packet. The register response is a packet sent by the neighbor server after receiving a register request from the edge device, and may include information of sites that have registered at the neighbor server. The information of a site may include a MAC address and an IP address of the site. The MAC address of a data center is the MAC address of the edge device of the data center via which the data center accesses the core network, and the IP address of the data center is the IP address of the edge device of the data center.

The IP address of the neighbor server may be configured in the edge device of each site in advance for use in a register request sent to the neighbor server. Reception of a register response sent by the neighbor server after an edge device sends a register request to the neighbor server indicates that the site has successfully completed the registration.

When the current site comes online in block 301, the process in which the edge device registers at the neighbor server and obtains information of all of the registered sites may include the following procedures. The edge device sends a register request including the MAC address and the IP address of the edge device to the neighbor server. After receiving the register request from the edge device, the neighbor server sends stored information of all registered sites to the edge device via a register response, records the current site as a registered site, and stores the MAC address and the IP address in the register request as information of the current site. After receiving the register response from the neighbor server, the edge device obtains the information of all registered sites from the register response. Hence, the edge device completes the registration at the neighbor server.

Generally, when a site comes online, its edge device sends a register request to the neighbor server, and the neighbor server may respond with a register response to the edge device after receiving the register request. When a failure occurs in the network or in the neighbor server, communications between the edge device and the neighbor server may be interrupted. In this case, the edge device may make multiple register attempts, e.g., periodically sending the register request until a register response is received from the neighbor server, or may perform the registration according to a pre-set registration rule.

According to an example, a list of registration attempt intervals may be pre-configured, and may include lengths of multiple time intervals. The multiple time intervals in the list may be taken as time intervals between multiple re-transmissions of the register request within a round of register attempts. If a register response is not received in the round of register attempts, a new round of register attempts is carried out by sending the register request according to the multiple time intervals in the list. Therefore, after the edge device sends the register request to the neighbor server, the process may further include: sending the register request again if a register response has not been received from the neighbor server within a current register attempt time interval, and taking a next time interval in a register attempt time interval list as the current register attempt time interval until a register response is received from the neighbor server; if the current register attempt time interval is the last time interval in the register attempt time interval list, the register request is sent again and the first time interval in the register attempt time interval list is taken as the current register attempt time interval to start a new round of register attempts.

Supposing the lengths of time intervals in the register attempt time interval list are 1, 2, and 4 seconds, the process of a site registering at the neighbor server may include the following procedures. In this example, the edge device sends a register request to the neighbor server and waits for 1 second, sends the register request to the neighbor server again and waits for 2 seconds if a register response has not been received within the 1 second, sends the register request to the neighbor server again and waits for 4 seconds if a register response has not been received within the 2 seconds, and takes another round of register attempts according to the time interval values in the register attempt time interval list if a register response has not been received within the 4 seconds.

In an example, if a new site registers at the neighbor server and comes online after the current site registered at the neighbor server and came online, the current site needs to implement a layer-2 interconnection with the newly registered site. Thus, the current site needs to obtain information of the newly registered site and generate a virtual bridge port for the newly registered site. Information of newly registered sites may be obtained according to a pre-set rule, e.g., sending a request to the neighbor server periodically to obtain information of newly registered sites. Alternatively, the neighbor server may inform all of the registered sites of information of a newly registered site after receiving a registration request from the newly registered site.

An example of the process will now be described in detail from the perspective of a "current site" that periodically sends requests to the neighbor server to obtain information about newly registered sites.

After registering at the neighbor server and coming online, the process in which the current site requests information of newly registered sites from the neighbor server may include: the edge device of the current site periodically sends a register request to the neighbor server (e.g. once in every first pre-set time interval), and obtains information of all registered sites from a register response from the neighbor server, searches in a tunnel encapsulation mapping table for a tunnel encapsulation entry corresponding to information of each registered site, determines the registered site is a newly registered site if no entry is found, and obtains information of the newly registered site.

Since the information of the site includes the IP address of the site, the IP address in the information of the site may be compared with an IP address of a remote site in each tunnel encapsulation entry of the tunnel encapsulation mapping table, if the two IP address are identical, the entry corresponds to the site; if there is no tunnel encapsulation entry in which the IP address of the remote site is identical with the IP address in the information of the site, the site is a newly registered site.

In practice, an edge device may be configured with multiple IP addresses, thus the edge device may be virtualized into multiple virtual edge devices according to the multiple IP addresses. Another site may generate multiple virtual bridge ports for the multiple virtual edge devices and may establish multiple tunnels with the site of the edge device. In this situation, it is not permitted that two of the virtual edge devices establish virtual bridge ports for each other because this may generate a loop. For example, given an edge device configured with two IP addresses, say IP 1 and IP 2, serving as IP addresses of a virtual edge device 1 and a virtual edge device 2 respectively. If virtual edge device 1 initially registered at the neighbor server, the neighbor server may record the site of virtual edge device 1 as a registered site. When virtual edge device 2 registers at the neighbor server, the neighbor server may send information of the site of virtual edge device 1 to virtual edge device 2 and may record the site of virtual edge device 2 as a registered site. As a result, virtual edge device 1 and virtual edge device 2 may generate a layer-2 tunnel for each other according to respective virtual bridge ports generated for each other. When data transmission is performed between the two virtual edge devices, a packet from the edge device is actually sent to the core network and then returned to the edge device, which may not be permitted.

In an example, each edge device has a unique MAC address, thus a site may be identified by the MAC address of the edge device of the site. Therefore, before the edge device generates a virtual bridge port for each registered site, the process may further include: determining whether a MAC address of the registered site is identical with the MAC address of the current site, skipping the step of generating a virtual bridge port for the registered site in response to a determination that the MAC addresses are identical, or performing the step of generating a virtual bridge port for the registered site in response to a determination that the bridge MAC addresses are not identical. Before the edge device generates a virtual bridge port for each newly registered site, the process may further include: determining whether a MAC address of the newly registered site is identical with the MAC address of the current site, skipping the step of generating a virtual bridge port for the newly registered site in response to a determination that the MAC addresses are identical, or performing generation of a virtual bridge port for the newly registered site in response to a determination that the MAC addresses are not identical.

Figure 4:
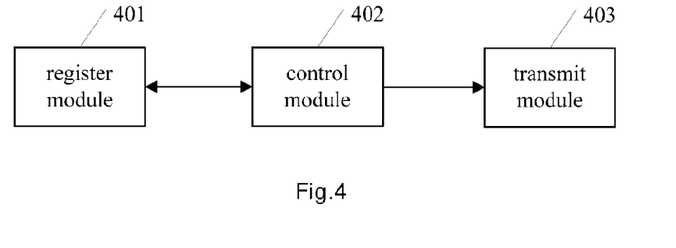
FIG. 4 is a schematic illustrating a structure of an edge device according to an example of the present disclosure.

In an example according to FIG. 4, the current site is able to perform communication with the registered site after coming online and generating a virtual bridge port for each registered site. However, when a failure occurs in the network or a site goes offline, two sites may be unable to perform the communication properly. Therefore, after generating a virtual bridge port for a registered site, the edge device of the current site may first check whether the edge device is able to perform communications with the registered site, and establishes a tunnel to the registered site via the virtual bridge port corresponding to the registered site and transmits data to the tunnel in response to a determination that communications are able to be performed with the registered site, or suspends data transmission in response to a determination that communications are unable to be performed with the registered site. According to an example, when a virtual bridge port is generated, the state of the virtual bridge port may be set as being unable to work properly, e.g., a DOWN state. Since a network failure or a site going offline may occur at any time, two sites should check whether communication may be performed properly with each other at certain times (e.g. periodically or intermittently).

In an example, a resolution request and a resolution response are defined in advance. The resolution request is a packet sent to a registered site after the edge device of the current site has generated a virtual bridge port for the registered site, and is sent to check whether normal communications may be carried out with the registered site. The resolution response is a packet sent by the registered site after receiving the resolution request from the edge device.

After sending a resolution request to a registered site and receiving a resolution response sent by the registered site, the edge device of the current site may set the virtual bridge port corresponding to the registered site to an UP state. Hence, the two sites may communicate data via the tunnel with each other. After that, the edge device may send a resolution request to the registered site at certain times to check whether communication with the registered site may be performed properly. Reception of a resolution response from the registered site indicates that the current site is able to communicate with the registered site normally, and that the state of the virtual bridge port corresponding to the registered site should be set to UP or be kept UP when the state of the virtual bridge port is already UP.

According to an example, a site may send a resolution request to each registered site periodically and may receive a resolution response from the registered site to check whether communication with the registered site is normal. If resolution responses in response to a pre-set number of consecutive resolution requests sent to a registered site are not received, a determination is made that the registered site has gone offline, and the state of the virtual bridge port corresponding to the registered site is set to be DOWN. An aging timer may also be set for the virtual bridge port, and the virtual bridge port may be deleted when the aging timer expires.

In an example, if the current site is to go offline, the current site may inform the neighbor server to delete the information of the current site. The neighbor server may inform other registered sites of the offline status of the site. A purge request may be defined in advance. The purge request may include information pertaining to the MAC address and the IP address of the site going offline. When the current site goes offline, the edge device of the current site sends a purge request to the neighbor server. After receiving the purge request, the neighbor server identifies the current site by using the MAC address and the IP address in the purge request, deletes information of the current site, and sends the purge request to other registered sites. A registered site receives the purge request, searches in a tunnel encapsulation mapping table for a tunnel encapsulation entry corresponding to the IP address in the purge request, identifies a virtual bridge port generated for the current site, and deletes the virtual bridge port.

Alternatively, when the current site goes offline, the current site may send a purge request to each registered site via the virtual bridge port generated for the registered site to make the registered site delete a virtual bridge port generated for the current site. However, there may be a few registered sites that cannot obtain the information about the offline status of the current site. For example, site X obtains information of the current site after going online, and generates a virtual bridge port for the current site. If the current site goes offline at this moment and has not obtained information on site X, the current site will not inform site X, thus site X does not obtain knowledge of the offline status of the current site in time.

According to an example, the neighbor server may perform an aging process for registered sites. When receiving a register request from a site, the neighbor server refreshes the state of the site and starts an aging timer. If another register request is received from the site before the aging timer expires, the neighbor server refreshes the state of the site and resets the aging timer. If another register request is not received from the site before the aging timer expires, the neighbor server determines that the site is offline, generates and sends a purge request to all of the registered sites except the site to make the other registered sites delete respective virtual bridge ports generated for the site.

The purge request sent by the neighbor server may be lost due to network reasons. When an edge device periodically sends a register request to the neighbor server and receives a register response from the neighbor server, besides identifying newly registered sites based on the information of all of the registered sites in the register response, the edge device may further identify a site that has logged off from the neighbor server and may delete a virtual bridge port generated for the site. The method of identifying a site that has logged off from the neighbor server based on information of registered sites in a register response may include: comparing an IP address of a remote site in a tunnel encapsulation entry corresponding to each virtual bridge port in a tunnel encapsulation mapping table stored in the edge device with the IP address of each site in the information of registered sites in the register response, if the IP address of the remote site is different from any IP address in the information of registered sites in the register response, deleting the virtual bridge port corresponding to the tunnel encapsulation entry.

According to an example, the current site generates a virtual bridge port for a registered site, configures a tunnel encapsulation entry corresponding to the virtual bridge port, and thus implements a layer-2 interconnection with the registered site. The procedures of the edge device establishing a tunnel with each registered site according to the tunnel encapsulation entry corresponding to the registered site in the tunnel encapsulation mapping table and transmitting data via the tunnel in block 303 may, for example, be implemented as follows.

When receiving an Ethernet packet that is from an internal Ethernet port and is destined for the registered site, the edge device performs tunnel encapsulation on the Ethernet packet according to a tunnel encapsulation entry corresponding to the virtual bridge port generated for the registered site, and sends the encapsulated packet. The packet reaches the registered site via the tunnel through the core network. The tunnel encapsulation of the Ethernet packet may take the IP address of the remote site in the tunnel encapsulation entry as the destination IP address of the packet and may take the IP address of the current site as the source IP address of the packet.

When an edge device receives an IP packet from the core network, which has been through tunnel encapsulation and whose destination IP address is the IP address of the edge device, the edge device performs tunnel decapsulation on the IP packet to obtain the source IP address, the destination IP address and an original Ethernet packet, and forwards the original Ethernet packet to an internal Ethernet port corresponding to the destination MAC address of the original Ethernet packet. The source IP address and the destination IP address obtained by tunnel decapsulation are used for searching in a tunnel encapsulation mapping table for a tunnel encapsulation entry which is then used for identifying a virtual bridge port. The virtual bridge port is the port from which the original Ethernet packet is received.

When receiving an Ethernet packet from an internal Ethernet port, an edge device may perform MAC address analysis using the Ethernet packet, and may notify other registered sites of the new MAC address analyzed via tunnels. The edge device may also record a MAC address notified by a registered site and the virtual bridge port via which the notification is received into a MAC address mapping table; and when receiving an Ethernet packet destined for the registered site from an internal Ethernet port, the edge device searches in the MAC address mapping table for the destination MAC address of the Ethernet packet to determine the virtual bridge port corresponding to the registered site, and performs tunnel encapsulation on the Ethernet packet according to a tunnel encapsulation entry corresponding to the virtual bridge port and sends the encapsulated packet. An edge device may also perform a MAC address analysis when receiving an Ethernet packet from a virtual bridge port. The analysis process may be the same as the analysis process performed when an Ethernet packet is received from an internal Ethernet port.

After generating a virtual bridge port for each registered site, the edge device of the current site may perform VLAN negotiation with the registered site via the tunnel to negotiate the type of VLAN supported by the virtual bridge port. The VLAN negotiation process may include: the edge device receives from the registered site a packet including VLAN types supported by the registered site, and obtains an intersection of the VLAN types supported by the registered site and VLAN types supported by the edge device of the current site. The intersection obtained is the VLAN types supported by the virtual bridge port.

It should be noted that, when two sites perform data transmission via a tunnel, an Ethernet packet which is a broadcast packet or a multicast packet may be transmitted within the sites via broadcasting or multicasting according to a conventional scheme. When transmitted via the core network to other registered sites, the Ethernet packet has been through tunnel encapsulation according to a tunnel encapsulation entry corresponding to the virtual bridge port before being transmitted to the core network, thus the Ethernet packet is transmitted in the core network through unicasting. For example, when an edge device receives a broadcast Ethernet packet from an internal Ethernet port, the edge device floods the Ethernet packet to all ports including virtual bridge ports. When the Ethernet packet is sent through a virtual bridge port, the edge device processes the Ethernet packet through proper tunnel encapsulation before the Ethernet packet is sent to the core network, and then the encapsulated packet is transmitted in the core network through unicasting.

In the above process, in various examples, not all of the procedures are necessary, and some of the procedures may be omitted or modified. In addition or alternatively, according to various examples, the order of the procedures being executed is not fixed, and may be adjusted. Each of the above processes discussed above is not necessarily limited to include only the described procedures, and may also include other procedures. To be concise, only procedures related with the implementation of the examples are mentioned in the above description, and those procedures that are the same as corresponding conventional procedures are not described.

An example provides an edge device of a data center for constructing a network topology and implementing a layer-2 interconnection of data centers.

FIG. 4 is a schematic illustrating a structure of an edge device according to an example. The edge device may include: a register module 401, a control module 402 and a transmit module 403. According to an example, the register module 401, the control module 402, and the transit module 403 comprise hardware modules, such as circuit components or individual circuits. According to another example, the register module 401, the control module 402 and the transmit module 403 comprise software modules stored in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. According to a further example, the register module 401, the control module 402, and the transmit module 403 comprise a combination of hardware and software modules.

The register module 401 is to register at a neighbor server and to obtain information of all of the registered sites when a site to which the edge device belongs is to go online, and to obtain information of newly registered sites from the neighbor server according to a pre-set rule after the site comes online.

The control module 402 is to generate a virtual bridge port for each registered site based on the information of the registered sites obtained by the register module 401, to configure a tunnel encapsulation entry corresponding to the virtual bridge port in a tunnel encapsulation mapping table, to generate a virtual bridge port for each newly registered site based on the information of the newly registered sites obtained by the register module 401, to configure a tunnel encapsulation entry corresponding to the virtual bridge port in a tunnel encapsulation mapping table.

The transmit module 403 is to establish a tunnel with each registered site according to the tunnel encapsulation entry corresponding to the registered site in the tunnel encapsulation mapping table, and to transmit data via the tunnel.

When registering at the neighbor server and obtaining information of all registered sites, the register module 401 may send a register request including information of the local site to the neighbor server, receive a register response sent by the neighbor server after the neighbor server received the register request, and obtain information of all registered sites from the register response received.

The register module 401 may store a pre-configured list of time intervals for register re-attempts.

After sending the register request to the neighbor server, the register module 401 may send the register request again if a register response has not been received from the neighbor server within a current register re-attempt time interval, take a next time interval in the list as the current register re-attempt time interval until a register response is received from the neighbor server; if the current register re-attempt time interval is the last time interval in the list, send the register request again and take the first time interval in the list as the current register re-attempt time interval to start a new round of register re-attempts.

When obtaining information of all newly registered sites from the neighbor server according to a pre-set rule, the register module 401 may send a register request to the neighbor server at each first pre-set time interval, receive a register response from the neighbor server, obtain information of all registered sites in the register response, search in a storage module for a tunnel encapsulation entry corresponding to each registered site according to the information of the registered site, determine that the registered site is a newly registered site when the tunnel encapsulation entry corresponding to the registered site is not found, and obtain information of the newly registered site.

Figure 5:
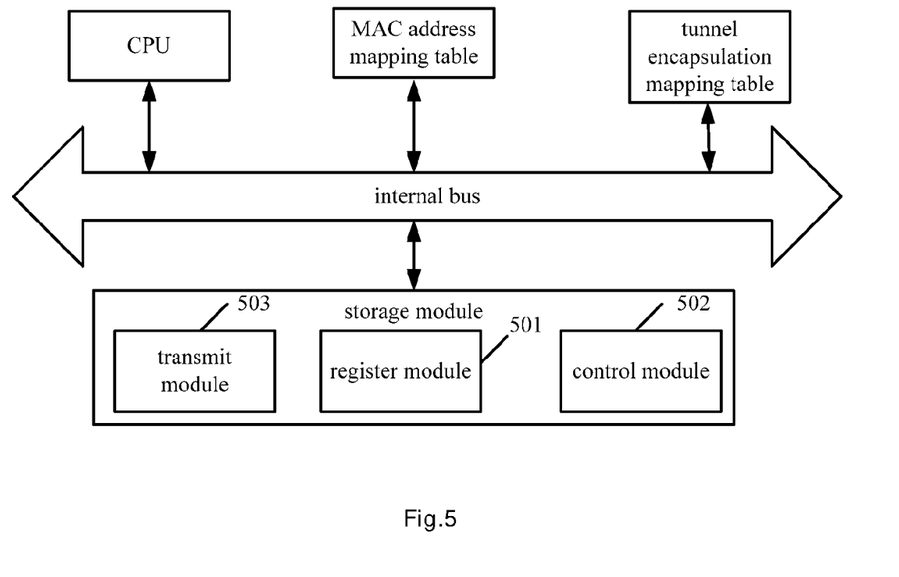
FIG. 5 is a schematic illustrating a structure of an edge device according to an example of the present disclosure.

The information of a registered site obtained by the register module 501 may include a MAC address of the registered site.

Before generating a virtual bridge port for each registered site based on the information of the registered site obtained by the register module 401, the control module 402 may determine whether the MAC address of the registered site is identical with the MAC address of the current site, skipping the step of generating the virtual bridge port for the registered site in response to a determination that the MAC address of the registered site is identical with the MAC address of the current site, or performing the step of generating the virtual bridge port for the registered site in response to a determination that the MAC address of the registered site is not identical with the MAC address of the current site.

Before generating a virtual bridge port for each newly registered site based on the information of the newly registered site obtained by the register module 401, the control module 402 may determine whether the MAC address of the newly registered site is identical with the MAC address of the current site, skipping the step of generating the virtual bridge port for the newly registered site in response to a determination that the MAC address of the newly registered site is identical with the MAC address of the current site, or performing the step of generating the virtual bridge port for the registered site in response to a determination that the MAC address of the newly registered site is not identical with the MAC address of the current site.

After generating the virtual bridge port for the registered site, the control module 402 may send a resolution request to the registered site, and may set the state of the virtual bridge port to be UP after receiving a resolution response from the registered site.

When generating the virtual bridge port for the registered site, the control module 402 may set the state of the virtual bridge port to be DOWN.

After generating the virtual bridge port for the registered site, the control module 402 may send a resolution request to the registered site at each second pre-set time interval, set the state of the virtual bridge port to be DOWN when resolution responses for a pre-set number of consecutive resolution request are not received, start an aging timer for the virtual bridge port, and delete the virtual bridge port when the aging timer expires.

The register module 401 may send a purge request including the IP address of the current site to the neighbor server, which transmits the purge request to other registered sites when the current site is to go offline, receive a purge request from the neighbor server, searching in the storage module for a tunnel encapsulation entry corresponding to the IP address of a logging off site in the purge request, and delete a virtual bridge port corresponding to the tunnel encapsulation entry.

The above modules are divided by logical functions, and in practice, a module may be implemented by multiple modules, or multiple modules may be implemented by one module. The edge device may include other modules. FIG. 5 is a schematic of a structure of an edge device according to one example. The edge device comprises a CPU, a storage module, a MAC address mapping table and a tunnel encapsulation mapping table, connected with each other via an internal bus. The memory stores machine readable instructions executable by the processor to implement a register module 501, a control module 502, a transmit module 503. Functions of the register module 501, the control module 502 and the transmit module 503 are similar to the functions of the register module 401, the control module 402 and the transmit module 403 discussed above with respect to FIG. 4. While shown as machine readable instructions executable by a processor in the example of FIG. 5, the modules could alternatively be implemented as hardware modules (e.g. an ASIC or other logic circuitry), or a combination of hardware and software.

From the above examples, it maybe seen that, when getting online, the current site registers at the neighbor server, obtains information of all registered sites, and generates a virtual bridge port for each registered site; after registering at the neighbor server, the current site obtains information of all newly registered sites periodically, and generates a virtual bridge port for each newly registered site; the current site establishes a tunnel to each registered site by utilizing the virtual bridge port corresponding to the registered site, and performs data transmission via the tunnel. Thus, layer-2 interconnection of data centers may be implemented by establishing the tunnels between the data centers via virtual bridge ports. Further, data centers are enabled to perform automatic detection of each other based on registration information of the data centers in the neighbor server by obtaining information of all registered sites periodically from the neighbor server.

The methods and apparatuses provided herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. All, or at least part of, the machine-readable instructions may be substituted by specific-purpose hardware, such as custom integrated circuits, gate array, FPGA, PLD and specific-purpose computers and so on.

A non-transitory machine-readable storage medium may also provided, which is to store instructions to cause a machine to execute a method as described herein. Specifically, a system or apparatus having a storage medium which stores machine-readable program codes for implementing functions of any of the above examples and which may make the system or the apparatus (or CPU or MPU) read and execute the program codes stored in the storage medium.

In this example, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize the technical scheme of any of the above examples.

In addition, the program codes implemented from a storage medium may be written in a storage in an extension board inserted in the computer or in a storage in an extension unit connected to the computer. In this example, a CPU in the extension board or the extension unit executes at least part of the operations according to the instructions based on the program codes to realize the technical scheme of any of the above examples.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An edge device to connect a first data center to at least one other data center, the edge device comprising:
    an interface; and
    a processor to:
        send, via the interface, information of the first data center to a neighbor server to register the first data center;
        obtain, via the interface, information of a registered data center from the neighbor server, wherein the information of the registered data center comprises a Media Access Control (MAC) address of the registered data center;
        determine whether the MAC address of the registered data center is identical to the MAC address of the first data center;
        if the MAC address of the registered data center is different from the MAC address of the first data center, generate a virtual bridge port for the registered data center to communicate with the first data center.

2. The edge device of claim 1, wherein the processor is to skip the generation of the virtual bridge port for the registered data center if the MAC address of the registered data center is identical to the MAC address of the first data center.

3. The edge device of claim 1, wherein the information of the first data center includes an Internet Protocol (IP) address and a MAC address of the first data center.

4. The edge device of claim 1, wherein the processor is to establish a layer-2 interconnection with a second edge device of the registered data center via the virtual bridge port.

5. A non-transitory computer readable medium storing machine readable instructions executable by a processor to:
    register information of a first data center with a neighbor server;
    obtain information of a second data center from the neighbor server, wherein the second data center is registered with the neighbor server;
    generate a virtual bridge port for the second data center to communicate with the first data center via a layer-2 interconnection;
    send a resolution request to the second data center;
    set a state of the virtual bridge port to be UP if a resolution response is received from the second data center; and
    set the state of the virtual bridge port to be DOWN if the resolution request is not received after a predetermined number of resolution requests are sent to the second data center.

6. The non-transitory computer readable medium of claim 5, wherein the machine readable instructions are executable by the processor to:
    delete the virtual bridge port if the resolution request is not received within a predetermined time interval.

7. The non-transitory computer readable medium of claim 6, wherein the neighbor server is to purge the registration of the second data center if the second data center is determined to be offline.

8. The non-transitory computer readable medium of claim 5, wherein the machine readable instructions are executable by the processor to:
    establish a tunnel with the second data center via the virtual bridge port.

9. The non-transitory computer readable medium of claim 8, wherein the tunnel comprises a layer-2 interconnection.

10. The non-transitory computer readable medium of claim 5, wherein the information of the first data center includes an Internet Protocol (IP) address and a MAC address of the first data center.

11. A non-transitory computer readable medium storing machine readable instructions executable by a processor to:
    register information of a first data center with a neighbor server;
    obtain information of a second data center from the neighbor server, wherein the second data center is registered with the neighbor server;
    generate, on an edge device of the first data center, a virtual bridge port for the second data center to communicate with the first data center via a layer-2 interconnection in a core network; and
    in response to receiving a broadcast Ethernet packet on an internal Ethernet port of the edge device, cause the edge device to flood the broadcast Ethernet packet to all ports of the edge device including the virtual bridge port, and perform tunnel encapsulation on the Ethernet packet flooded to the virtual bridge port before transmitting the encapsulated packet into the core network by unicasting.

12. The non-transitory computer readable medium of claim 11, wherein the machine readable instructions are executable by the processor to:
    configure a tunnel encapsulation entry corresponding to the virtual bridge port in a tunnel encapsulation mapping table at the edge device, wherein the tunnel encapsulation entry includes the virtual bridge port, an IP address of an edge device of the second data center, and an IP address of the edge device of the first data center.

13. An edge device to connect a first data center to at least one other data center via a core network, the edge device comprising:
    an interface; and
    a processor to determine an address of a second edge device of a second data center and establish a layer-2 interconnection with the second edge device via the interface without relying on multicasting in the core network.

14. The edge device of claim 13, wherein the processor is to:
    register the first data center with a neighbor server;
    obtain information of other registered data centers, including the second data center, from the neighbor server, wherein the obtained information includes the address of the second edge device.

15. The edge device of claim 13, wherein the layer-2 interconnection comprises a layer-2 tunnel, and, to establish the layer-2 tunnel, the processor is to generate a virtual bridge port for the layer-2 tunnel, and establish the layer-2 tunnel via the virtual bridge port.

* * * * *